United States Patent [19]
Kimura et al.

[11] Patent Number: 5,513,970
[45] Date of Patent: May 7, 1996

[54] ROBOT FOR EJECTION OF AN OBJECT FROM BETWEEN TWO BODIES

[75] Inventors: Akira Kimura, Tokyo; Keiichi Nakamachi, Saitama; Atsushi Saito, Kanagawa; Tsuyoshi Inoue, Kanagawa; Morio Tominaga, Kanagawa, all of Japan

[73] Assignee: Sony Corporation, Japan

[21] Appl. No.: 234,949

[22] Filed: Apr. 28, 1994

[30] Foreign Application Priority Data

May 10, 1993 [JP] Japan ................................ 5-132569
Jul. 12, 1993 [JP] Japan ................................ 5-195097

[51] Int. Cl.⁶ ........................... B29C 45/04; B29C 45/42
[52] U.S. Cl. ................... 425/139; 425/150; 425/556; 425/DIG. 5; 264/334
[58] Field of Search ................................ 425/139, 150, 425/554, 556, DIG. 5; 264/334, 335

[56] References Cited

U.S. PATENT DOCUMENTS

| | | | |
|---|---|---|---|
| 4,204,824 | 5/1980 | Paradis | 425/139 |
| 4,212,622 | 7/1980 | Kikucki et al. | 425/556 |
| 4,368,018 | 1/1983 | Rees et al. | 425/138 |
| 4,732,554 | 3/1988 | Hellmann | 425/139 |
| 4,795,124 | 1/1989 | Nagai | 425/556 |
| 4,976,603 | 12/1990 | Disimone | 425/556 |
| 5,122,051 | 6/1992 | Joyner | 425/556 |
| 5,244,606 | 9/1993 | Maus et al. | 425/554 |
| 5,250,239 | 10/1993 | Herbst | 425/139 |
| 5,256,364 | 10/1993 | Herbst | 425/556 |

FOREIGN PATENT DOCUMENTS

| | | |
|---|---|---|
| 63-197606 | 8/1988 | Japan . |
| 63-272514 | 11/1988 | Japan . |

*Primary Examiner*—Robert J. Warden
*Assistant Examiner*—Theresa T. Snider
*Attorney, Agent, or Firm*—Ronald P. Kananen

[57] ABSTRACT

Disclosed is a robot for ejecting an object mounted to a movable body from the movable body, including: a holding section for holding said object mounted on the movable body; and a moving section for ejecting the object from the movable body by movement of the holding section; wherein the moving section includes a first guide section meshing with the holding section for linearly moving the holding section in a first direction by rotation with respect to the action of the movable body; and a second guide section for rotating the holding section in a second direction along with the rotation of the guide section directed in the first direction. The first guide section may be composed of a ball screw, the holding section has a nut, and the ball screw meshes with the nut. Moreover, the second guide means may be composed of a cam and a cam follower meshing with the cam. Additionally, the movable body may be composed of a movable die of a molding machine.

16 Claims, 16 Drawing Sheets

CONTROLLER

DEVELOPMENT OF CYLINDRICAL CAM

CAM LENGTH L

AVERAGE GRADIENT $\theta = f(x)$   $f$ : CAM FUNCTION $$\dot{\theta} = \frac{d\theta}{dt}$$
$$= \frac{df}{dx}\frac{dx}{dt}$$
$$= \frac{df}{dx}\dot{x}$$

ically cam curve for actuating the mechanical cam, the cam must be replaced; -->
ROBOT FOR EJECTION OF AN OBJECT FROM BETWEEN TWO BODIES

BACKGROUND OF THE INVENTION

1. Field of the Invention

The present invention relates to a robot for moving an object from a movable body, and particularly to a robot suitable for ejecting a molded product from dies of a molding machine.

2. Description of the Related Art

The ejectors for ejecting molded products from injection molding machines are generally separated into the following two types.

The ejector of the first type starts the ejection of a molded product when dies of a molding machine are fully opened. On the contrary, the ejector of the second type starts the ejection of a molded product according to the opening action of dies of a molding machine by way of a mechanical cam.

In the ejector of the first type, however, the ejection takes a long time because it starts after dies of a molding machine are fully opened.

The ejector of the second type is expected to eject a molded product more rapidly than the ejector of the first ejector; however, it occasionally takes a time longer compared with the ejector of the first type.

The ejection time described above means a time elapsed between the full opening and the full closing of dies of a molding machine.

The reason why the ejector of the second type takes a longer time is that the ejector of this type is suppressed in its moving speed depending on the magnitude of the power for moving the dies of the molding machine. Moreover, the ejector of the second type has a disadvantage in that it is not stopped directly after dies are stopped and also not stopped at a specified position because of a large inertia of the ejector.

Additionally, in the case of changing a cam curve for actuating the mechanical cam, the cam must be replaced; accordingly the cam curve cannot be easily changed, which makes it difficult to achieve the optimization of the ejection.

OBJECT AND SUMMARY OF THE INVENTION

An object of the present invention is to provide a robot capable of handling an object such as a molded product for a short time, and of easily changing the cam curve according to the ejecting status.

Another object of the present invention is to provide an ejecting robot capable of simplifying the structure and reducing the weight of the prior art ejecting robots, and of handling an object such as a molded product for a short time; and to provide an ejecting method using the ejecting robot.

To achieve the above object, according to the first aspect of the present invention, there is provided an industrial robot comprising: opened/closed bodies composed of two members, which are capable of being opened/closed and contain an object therebetween; a holding means for holding the object; a driving means for moving the holding means in the opening/closing direction of the opened/closed bodies; an advancing/retracting means which advances/retracts with respect to the opened/closed bodies by turning of the holding means when the holding means is moved in the opening/ closing direction of the opened/closed bodies; a position sensor for detecting the positions of the opened/closed bodies; and a control means of receiving the position information of the opened/closed bodies from the position sensor, and controlling the drive means for ejecting the object from the opened/closed bodies on the basis of the position information of the opened/closed bodies.

The control means preferably controls the advancing/retracting means to be moved in the release direction at an approximately maximum speed of the advancing/retracting means when the opened/closed bodies are closed.

Moreover, the control means preferably controls the holding means to be moved in the moving direction of the opened/closed bodies by rotation of a feed screw, and the advancing/retracting means includes a guide means for advancing/retracting with respect to the opened/closed bodies by turning of the holding means when the feed screw is rotated.

Additionally, the opened/closed bodies are preferably composed of dies of a molding machine.

According to the second aspect of the present invention, there is provided an ejecting method of ejecting an object mounted on a movable body from the movable body, comprising the steps: meshing a holding means for holding the object mounted on the movable body with a guide means directed in a first direction, and rotating the guide means directed in the first direction with respect to the action of the movable body, thereby linearly moving the holding means in the first direction; and rotating the holding means in a second direction along with the rotation of the guide means directed in the first direction, thereby ejecting the object from the movable body.

According to the third aspect of the present invention, there is provided a robot for ejecting an object mounted to a movable body from the movable body, comprising: a holding means for holding the object mounted on the movable body; and a moving means for ejecting the object from the movable body by movement of the holding means; wherein the moving means includes a first guide means meshing with the holding means for linearly moving the holding means in a first direction by rotation with respect to the action of the movable body; and a second guide means for rotating the holding means in a second direction along with the rotation of the guide means directed in the first direction.

The first guide means is preferably composed of a ball screw, the holding means has a nut, and the ball screw meshes with the nut.

Moreover, the second guide means is preferably composed of a cam and a cam follower meshing with the cam.

Additionally, the movable body is preferably composed of a movable die of a molding machine.

DESCRIPTION OF THE PREFERRED EMBODIMENTS

Hereinafter, preferred embodiments of the present invention will be described in detail with reference to the accompanying drawings.

Embodiment 1

Figure 1:
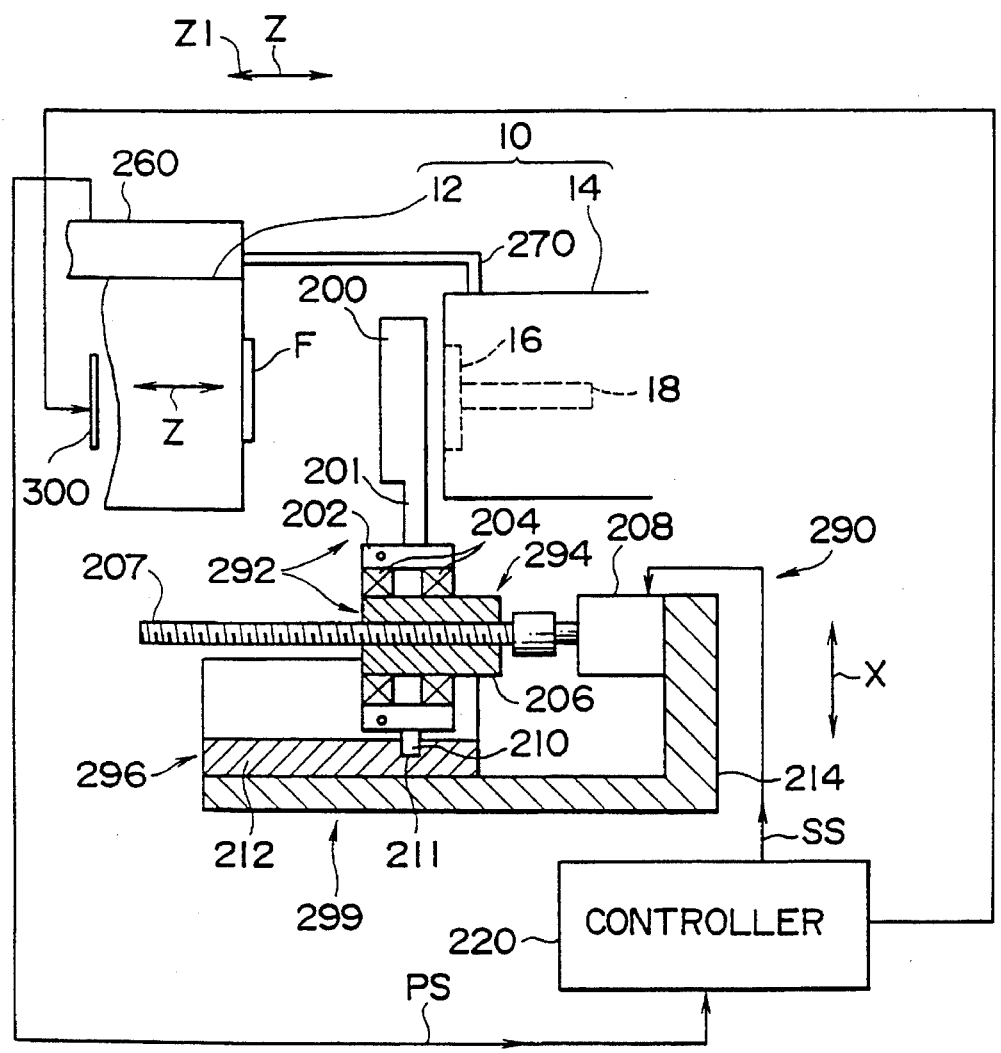
FIG. 1 is a view showing a robot and a molding machine according to a preferred embodiment of the present invention.
Figure 2:
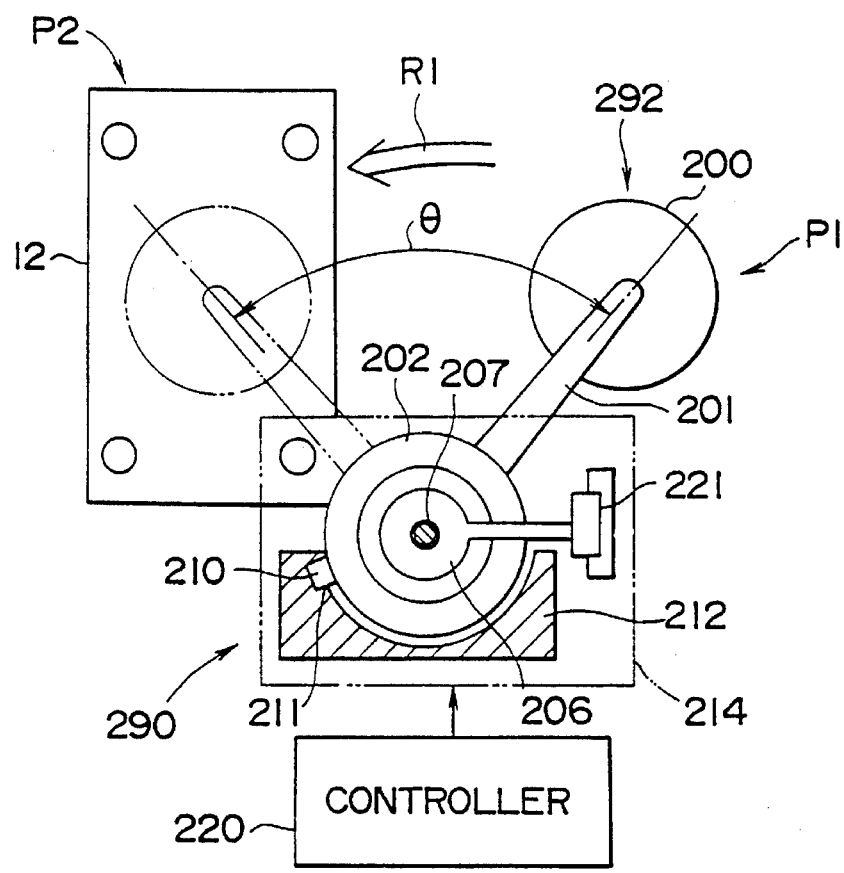
FIG. 2 is a side view of the molding machine and the robot shown in FIG. 1.

FIG. 1 is a view showing a robot according to the preferred embodiment of the present invention; and FIG. 2 is a side view of the robot shown in FIG. 1.

A robot 290 shown in FIGS. 1 and 2 is used to eject a molded product F molded by an injection molding machine 10.

The injection molding machine 10 will be first described below.

The injection molding machine 10 has heads 12 and 14, which may be called "dies" or "open/closed bodies". The head 12 is movable in the direction of the arrow Z by a drive means 300 while holding the molded product F.

The head 14 is fixed, and it is formed with a cavity 16 and a passage 18 through which a molding material is poured to the cavity 16.

The molded product F having a disk-like shape or the like can be formed in the cavity 16 between the heads 12 and 14. The molded product F is used for an information recording medium such as an optical disk, and optical-magnetic disk.

The robot 290 will be described below.

As shown in FIGS. 1 and 2, the robot 290 is generally provided with a moving means 292, position sensor 260 and a controller 220.

The moving means 292 will be described below.

The moving means 292 is adapted to move the molded product F from the head as the so-called moving body, or to transfer the separated molded product F. The moving means 292 includes a holder 200 removably holding the molded product F, connecting arm 201 and a supporting member 202.

The holder 200 is connected to the supporting member 202 by means of the connecting arm 201. The holder 200 is capable of removably attracting the molded product F by vacuum attraction.

Moreover, the supporting means 202 of the moving means 292 is rotatably held by a nut 206 through a bearing 204, and which is formed into a ring shape or the like. The moving means 292 further includes a drive means 294 and advancing/retracting means 296.

The drive means 294 is adapted to move the holder 200 in the direction of the arrow Z. Namely, the drive means 294 includes a motor 208, a ball screw 207 rotated by the output shaft of the motor 208, and the nut 206. The ball screw 207 is rotated by the drive of the motor 208, to move the nut 206 and the holder 200 integrally in the direction of the arrow Z.

The advancing/retracting means 296 will be described below.

The advancing/retracting means 296 has a guide means 299. The guide means 299 includes a cylindrical cam 212 and a cam follower 210. The cam follower 210 is mounted on the outer peripheral surface of the supporting member 202. As shown in FIGS. 1 and 2, a cam groove 211 meshing with the cam follower 210 is formed on the inner surface of the cylindrical cam 212. The cylindrical cam 212 and the motor 208 are preferably fixed on a base 214.

Figure 3:
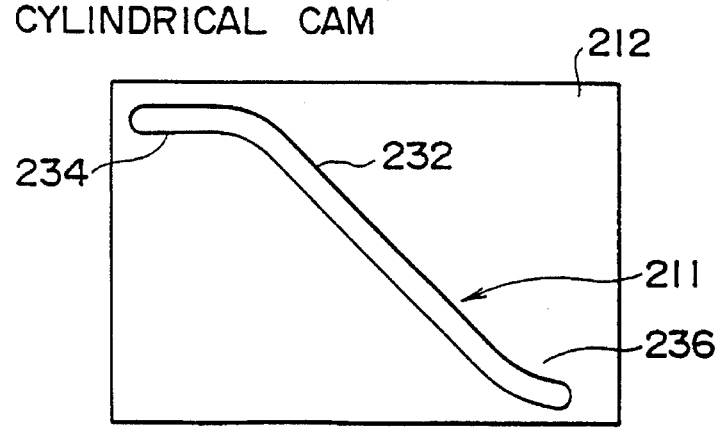
FIG. 3 is a development of a cylindrical cam in the robot shown in FIG. 1.

FIG. 3 shows the development of the cam groove 211 of the cylindrical cam 212. The cam groove 211 has a rotational direction accelerating area 236, a rotational direction decelerating area 232 and a final linearly moving area 234.

As the ball screw 207 is rotated by the drive of the motor 208 shown in FIG. 1, the holder 200 is moved in the direction of the arrow Z, and simultaneously, as shown in FIG. 2, it is swung by a swing angle θ between a retracting position P1 and a ejecting position P2.

Figure 4:
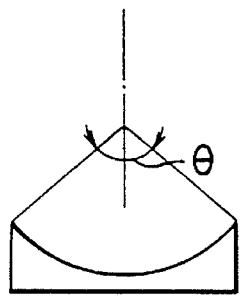
FIG. 4 is a view showing an example of a swing angle of a holder of the robot.
Figure 5:
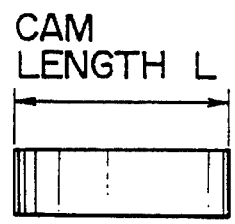
FIG. 5 is a view showing an example of the cam length of the cylindrical robot.

The swing angle θ is preferably about 90°, as shown in FIG. 4. The cam length L is shown in FIG. 5, which is for example 120 mm. The radius of the swing angle θ is for example 35 mm in FIG. 4.

Figure 6:
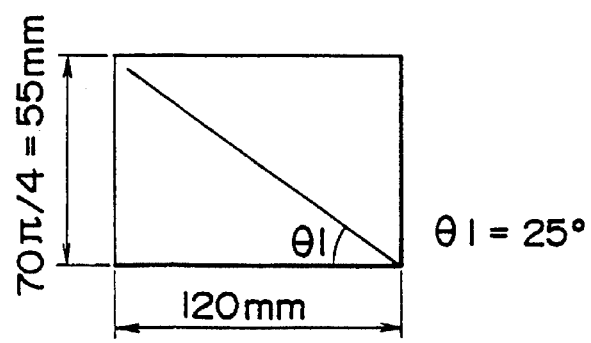
FIG. 6 is a view showing an example of an average gradient of a cam groove of the cylindrical cam.

FIG. 6 shows an example of an average gradient of the cam groove 211 of the cylindrical cam. The average gradient θ1 is for example 25°.

In addition, a slider 221 shown in FIG. 2 is a rotation preventive member for preventing the rotation of the nut 206 accompanied with the ball screw 207.

Next, a controller 220 and a position sensor 260 will be described below.

The controller 220 is adapted to receive positional information from the position sensor 260. The position sensor 260 is mounted on the head 12. A rod 270 of the position sensor 260 is fixed on the fixed head 14. Thus, by movement of the movable head 12 in the direction of the arrow Z, it is possible to obtain the position of the movable head 12 relative to the fixed head 14, that is, the opening degree between the heads 12 and 14, as the positional information.

The position sensor 260 is composed of, for example an encoder. On the basis of the positional information PS from the position sensor 260, the controller 220 performs the servo-position control for the motor 208.

Example 1 for Embodiment 1

Next, the method of embodiment 1 will be described below.

Figure 7:
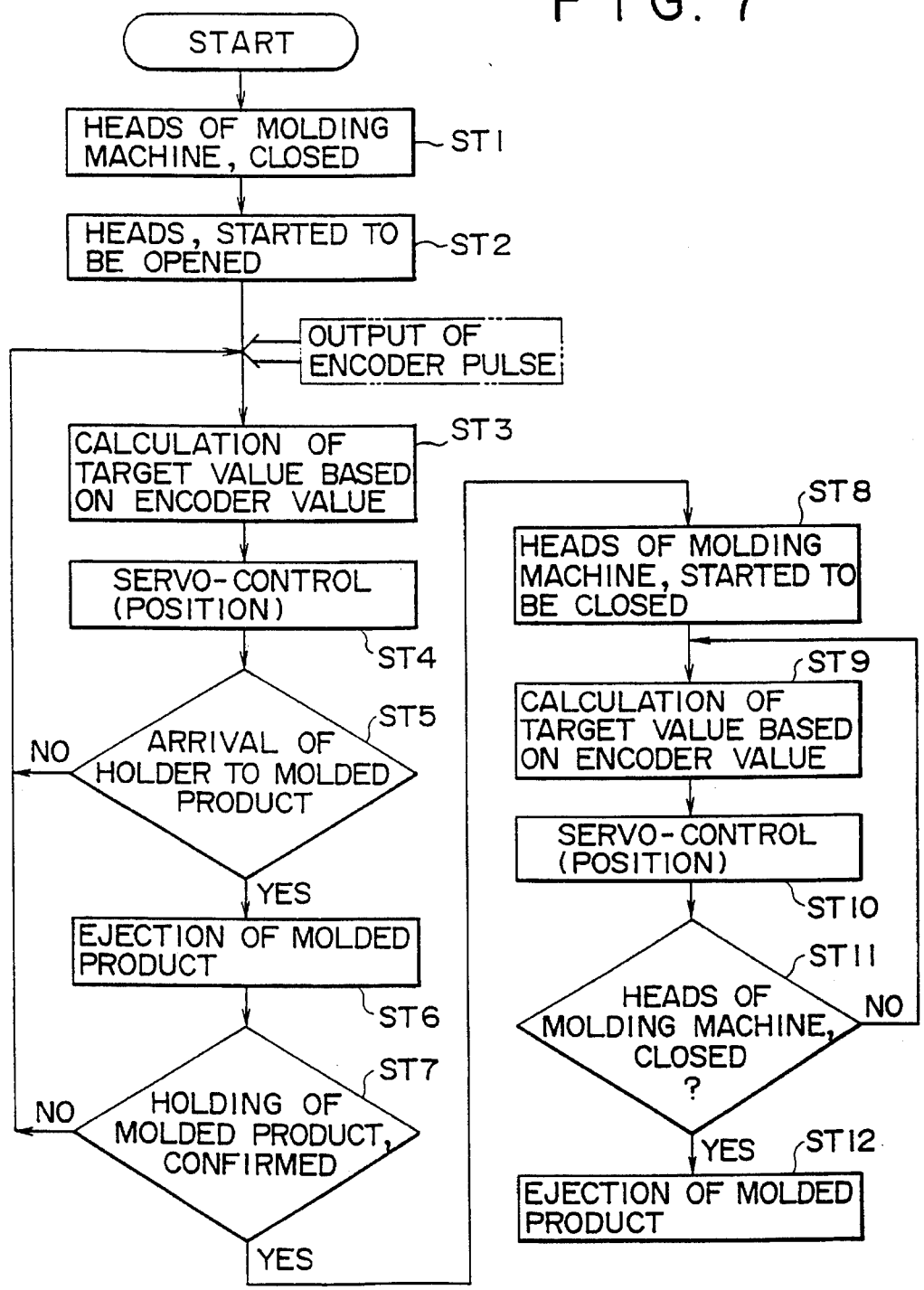
FIG. 7 shows a flowchart of the method of the embodiment 1 shown in FIGS. 1 and 2.

FIG. 7 shows a flowchart example 1 having the steps ST1 to ST12.

First, in the step ST1, the heads 12 and 14 of the molding machine 10 shown in FIG. 1 are closed. At this time, the cavity 16 is filled with resin, to mold the molded product F.

Next, as the head 12 is started to be opened by a drive means 300 (step ST2), the position sensor 260 shown in FIG. 1 detects position information PS of the head 12, and transmits it to the controller 220. Namely, a pulse of the position information PS is given from the position sensor 260 composed of the encoder to the controller 220. The controller 220 calculates a target value, that is, a target position to which the holder 200 is to be moved, by the software on the basis of the encoder value (step ST3).

On the basis of the target value, as shown in FIG. 1, the controller 220 transmits a servo-position control signal SS to the motor 208, to perform the servo-position control for the motor 208 (step ST4).

Next, the controller 220 judges whether or not the holder 200 shown in FIG. 1 reaches the molded product F. When judging that the holder 200 reaches the molded product F, the controller 220 transmits a command of ejecting the molded product F to the drive means 300 of the injection molding machine 10. Thus, the drive means 300 is operated to project a pin (not shown) from the movable head 12 of the injection molding machine 10, to eject the molded product F from the head 12 (step ST5).

When the controller 220 judges that the holder 200 does not reach the molded product F, the process is returned to the step ST3 again.

In the case that the molded product F is ejected in the step ST6, it is confirmed whether or not the molded product F is held by the holder 200. If not confirmed, the process is returned to the step ST3. The confirmation is made by giving the output of a sensor disposed on the holder 200 to the controller 220.

The detail action of the holder 200 which approaches the molded product F and holds it will be described with reference to FIGS. 1 and 2.

On the basis of the servo-control signal SS from the controller 220, the motor 208 is driven and the ball screw 207 is rotated, so that the holder 200 is started to be moved in the direction of the arrow 2 (left side of FIG. 1). At this time, the cam follower 210 is guided along the cam groove 211. Thus, as shown in FIG. 2, the holder 200 is started to be rotated from the retracting position P1 to the ejecting position P2 along the rotational direction R1 within the range of the swing angle θ.

First, the holder 200 is, as shown in FIG. 3, rapidly rotated in the rotational direction R1 along the rotational direction accelerating area 236, and is decelerated in the rotational direction decelerating area 232, to be located at the ejecting position P2 shown in FIG. 2. Finally, the holder 200 is moved in the direction of the arrow Z1 shown in FIG. 1 in the final linearly moving area 234.

Referring to FIG. 7 again, after the holding of the molded product F by the holder 200 is confirmed, that is, after the molded product F is vacuum-attracted by the holder 200, the controller 220 transmits a signal to the molding machine 10 (step ST7), to close the head 12 of the molding machine 10 (step STS).

As the head 12 is started to be closed, the positional information PS being the encoder value of the position sensor 260 is given to the controller 220. The controller 220 calculates, on the basis of the encoder value, a target value corresponding to a target position to which the holder 200 is to be moved (step ST9).

The controller 220 transmits the servo-position control signal SS to the motor 208, to perform the servo-position control for the motor 208 (step ST10). Thus, the controller 220 judges whether or not the heads 12 and 14 of the molding machine 10 are closed (step ST11). When the heads 12 and 14 are not closed, the process is returned to the step ST9.

When the controller 220 judges, on the basis of the encoder value from the position sensor 260, that the heads 12 and 14 of the molding machine 10 are closed, the holder 200 discharges the molded product F attracted thereto to a different location.

Example 2 for Embodiment 1

Figure 8:
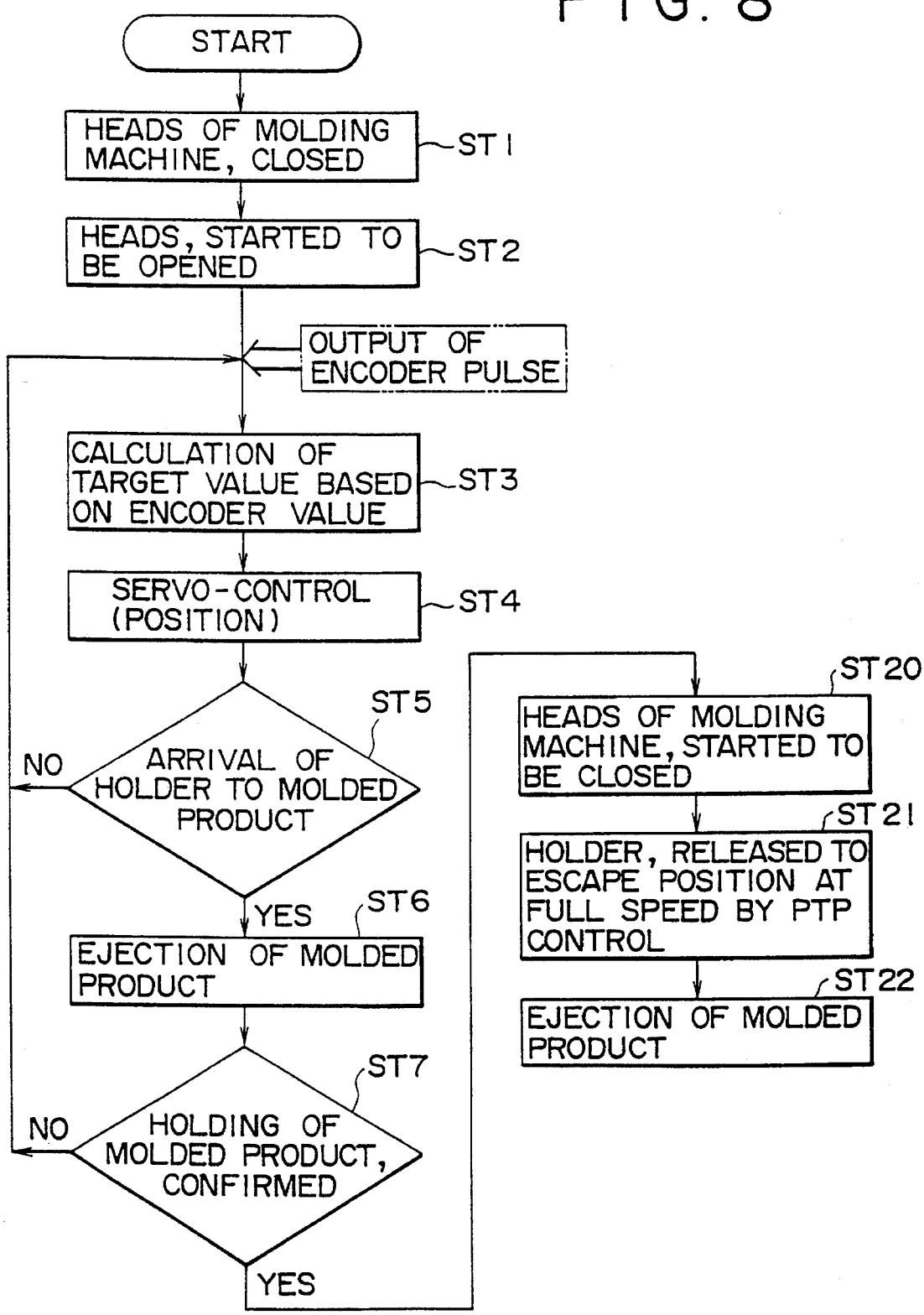
FIG. 8 is a view showing another flowchart of the embodiment 1 shown in FIGS. 1 and 2.

In a flowchart example 2 shown in FIG. 8, the steps from the step ST1 to the step ST7 are the same as those from the step ST1 to the step ST7 of the flowchart example 1. Accordingly, the description of the actions from the step ST1 to the step ST7 is omitted.

The flowchart example 2 shown in FIG. 8 is different from the flowchart example 1 in the steps from the step ST20 to the step ST22.

Namely, when it is confirmed that the molded product F shown in FIG. 1 is held by the holder 200 (step ST7), the controller 220 transmits a signal to the drive means 300 of the molding machine 10, to close the head 12 (step ST20).

As the head 12 is started to be closed to the head 14, the holder 200 is released at a full speed up to the retracting position P1 as the escape position (see FIG. 2) by PTP control. The PTP control is the so-called point-to-point control, and is intended to achieve the full speed release irrespective of the path.

Figure 9:
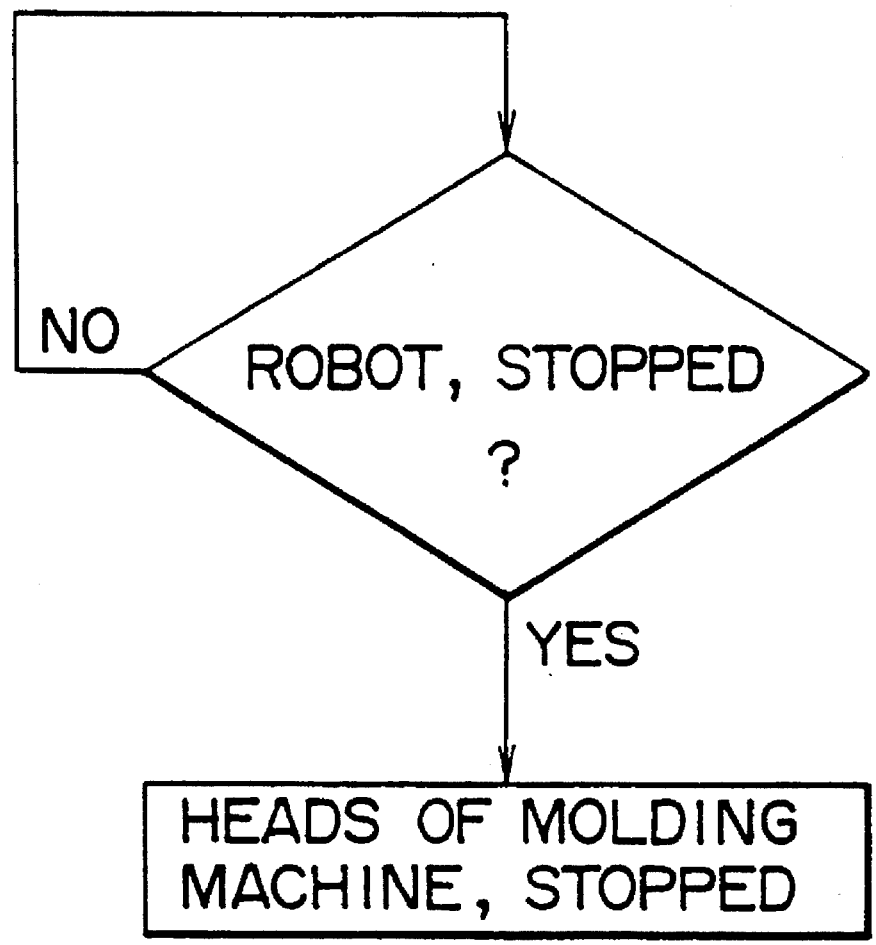
FIG. 9 is a view for explaining the PTP (point-to-point) control in the action example 2 shown in FIG. 8.

As the above-described full speed release by the PTP control, the method shown in FIG. 9 is adopted. Namely, to prevent the heads 12 and 14 from approaching the holder 200 excessively and from being brought in contact therewith, even in the case that the robot 290 is urgently stopped, the holder 200 is controlled to be retracted from the position between the heads 12 and 14 at a full speed.

Next, the preferred embodiment 2 of the present invention will be described below.

Embodiment 2

Figure 10:
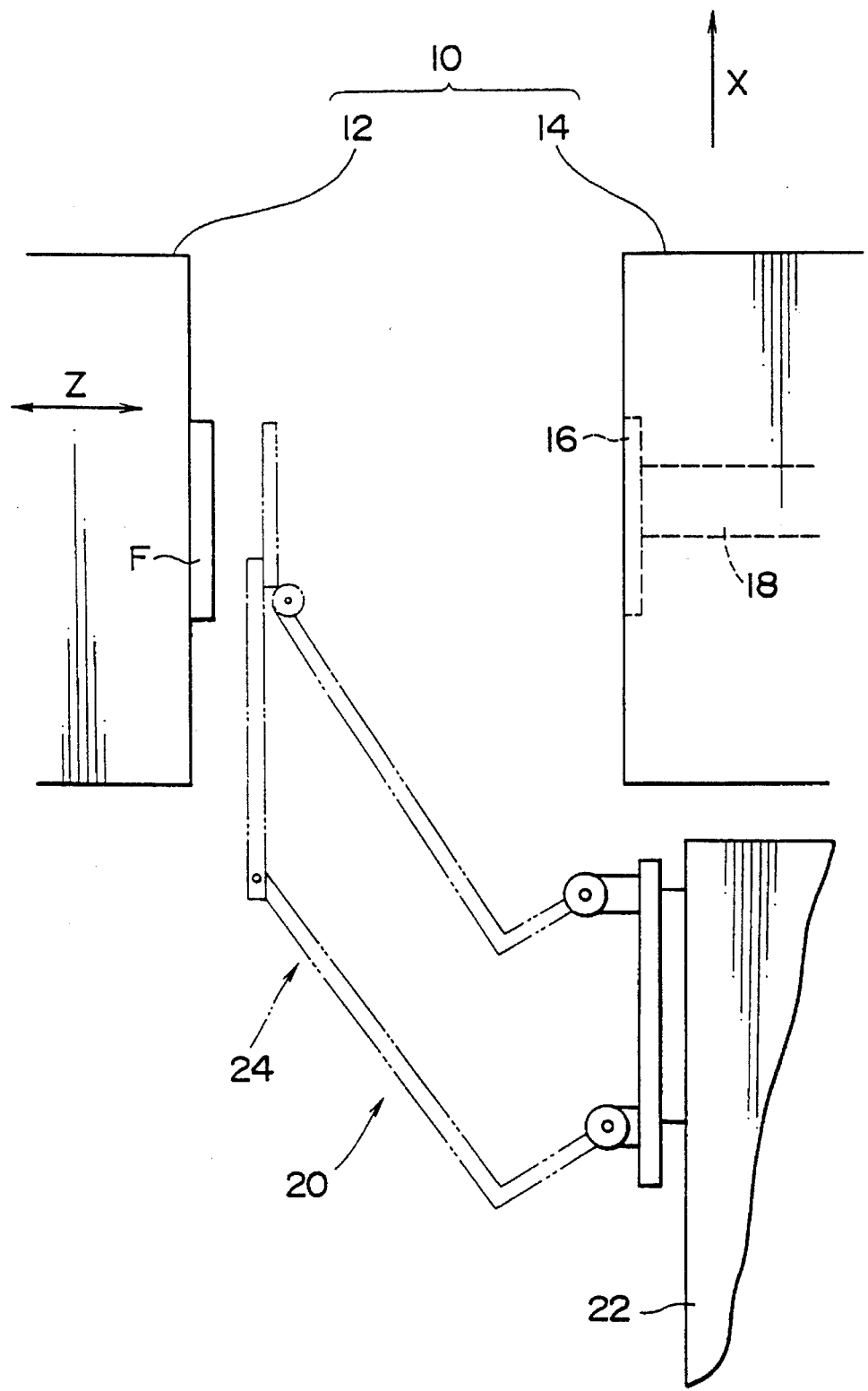
FIG. 10 is a view showing an arm mechanism of the robot and part of the molding machine according to a preferred embodiment 2 of the present invention.

FIG. 10 shows part of a robot according to the preferred embodiment 2 of the present invention, and heads 12 and 14 of a molding machine 10 used in combination with the robot 20.

Referring to FIG. 10, of a pair of the head 12 and 14 disposed in the molding machine 10, the head 12 is movable in the direction of Z by a drive means 300. FIG. 10 shows the state that the heads 12 and 14 are opened. The head 14 is formed with a cavity 16, and a passage 18 through which a molding material is supplied to the cavity 16.

The heads 12 and 14 is closed by the movement of the head 12 in the direction of Z. In the state that the heads 12 and 14 are closed, a resin is supplied from the passage 18 to the cavity 16 between the heads 12 and 14, to mold a molded product F having a disk-like shape or the like.

The molded product F thus molded is used for an information recording medium such as an optical disk and optical-magnetic disk. The molded product F can be ejected from the head 12 at a high speed by an attracting means such as an arm mechanism 24 of the robot 20 as described later.

Next, the robot 20 for ejecting the molded product F will be described below.

Figure 11:
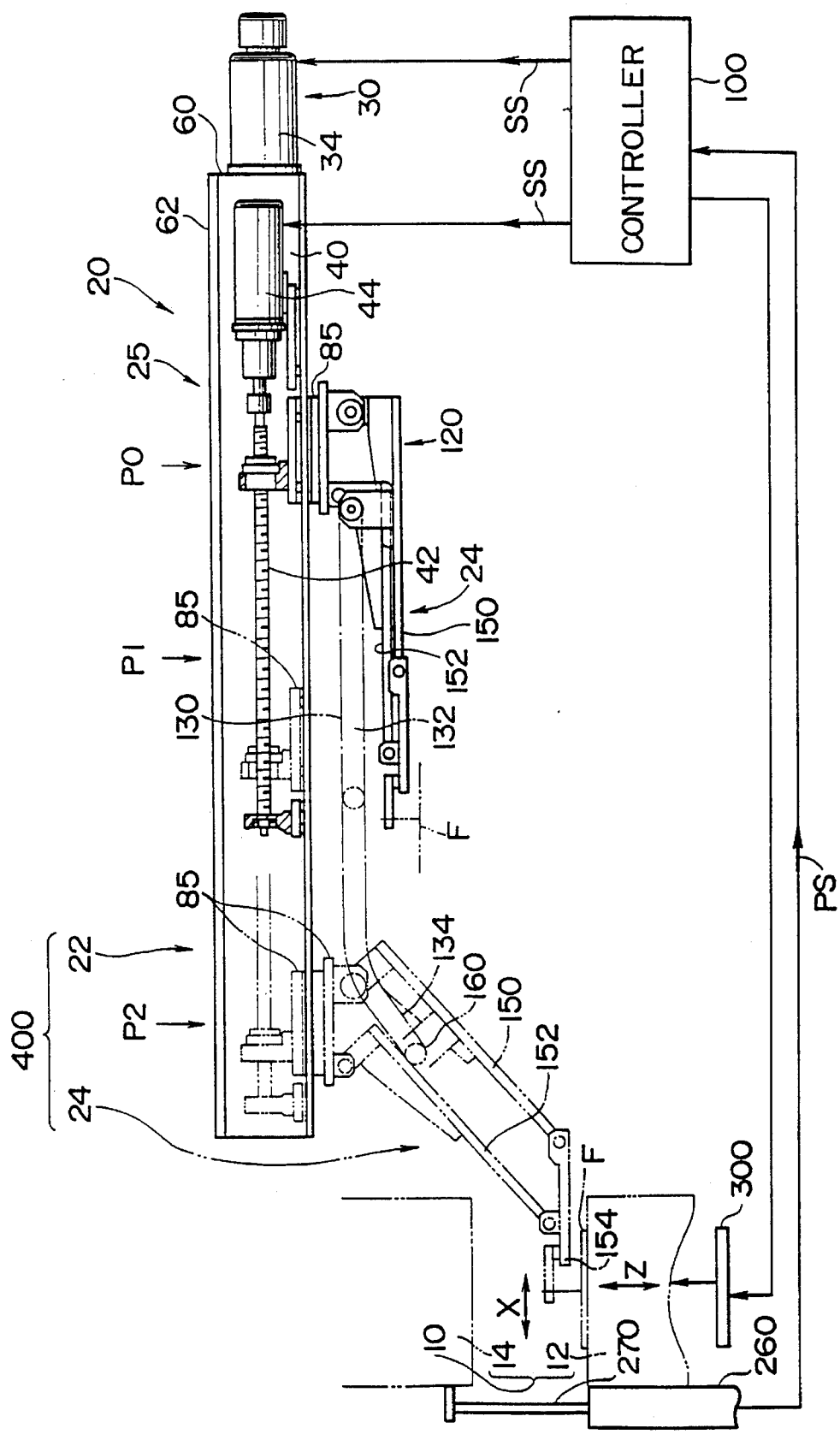
FIG. 11 is a plan view showing the robot of the embodiment and the molding machine shown in FIG. 1.
Figure 12:
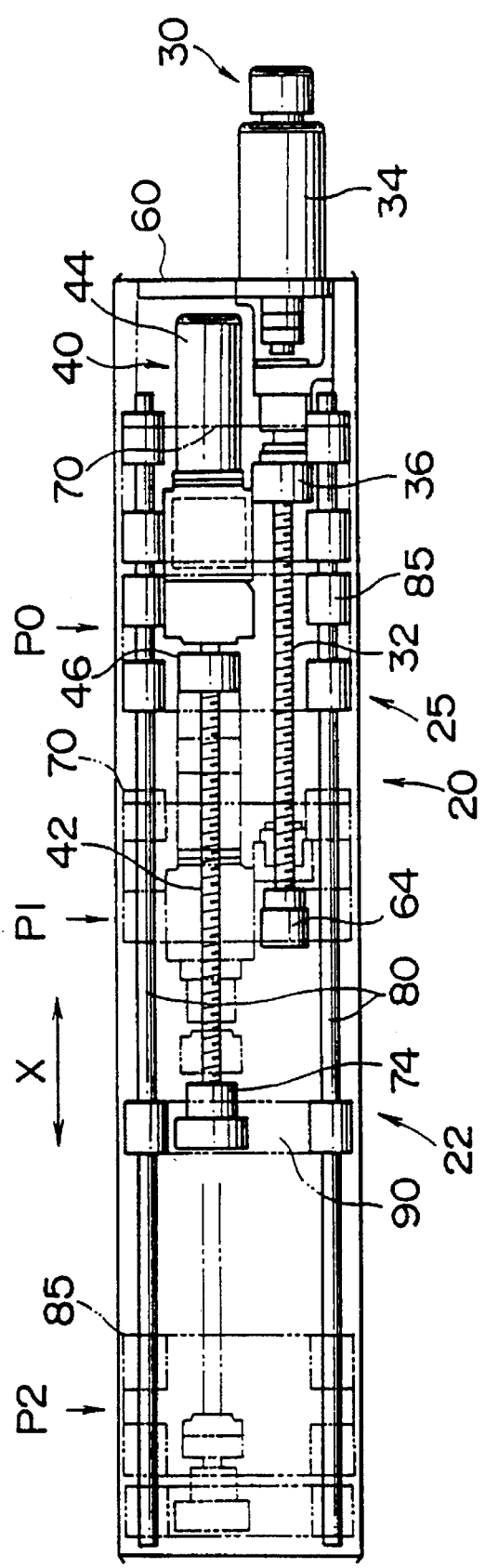
FIG. 12 is a view showing the interior of the moving means of the robot shown in FIG. 2.

As shown in FIGS. 11 and 12, the robot 20 has a moving means 400, a position sensor 260 and a controller 100.

The moving means 400 has a movement operating portion 22 and an arm mechanism 24 (or robot arm) moved by the movement operating portion 22 for ejecting the molded product F.

Movement Operating Portion 22

First, the moving portion 22 will be described.

FIG. 11 shows the movement operating portion 22, wherein the arm mechanism is moved by the movement operating portion 22. The movement operating portion 22 is adapted to insert an arm head 154 of the arm mechanism 24 between the heads 12 and 14 at a speed being two times as much as the normal speed, that is, the doubling speed, and to retract the arm head 154 of the arm mechanism 24 to which the molded product F is attracted, from the position between the heads 12 and 14.

Figure 13:
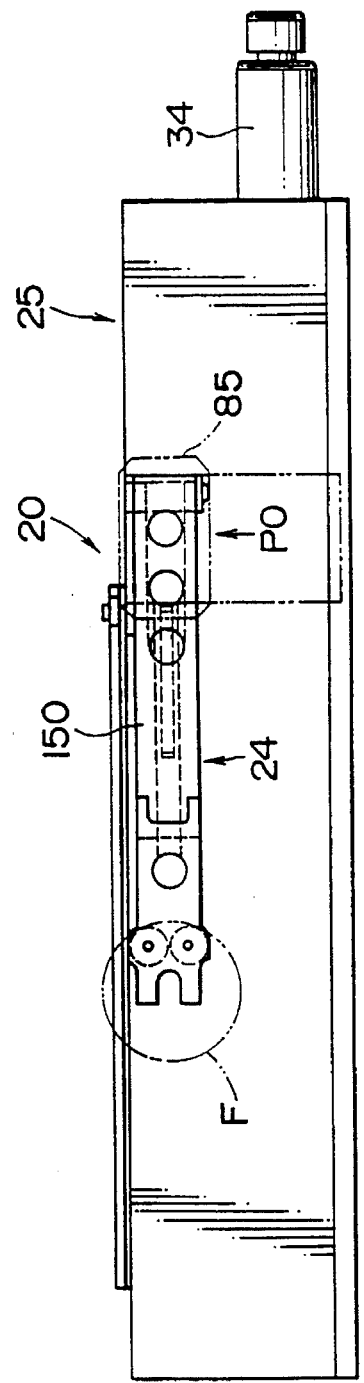
FIG. 13 is a bottom view of the moving means of the robot shown in FIG. 2.
Figure 14:
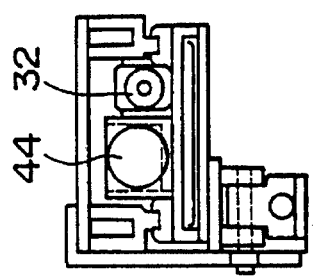
FIG. 14 is a sectional view of the moving means of the robot shown in FIG. 2.

The movement operating portion 22 has a main body portion 25, and first and second shaft portions 30 and 40 disposed on the main body portion 25. The first and second shaft portions 30 and 40 are disposed in parallel to each other along the direction of the arrow X, as shown in FIGS. 12 to 14.

In particular, as shown in FIG. 12, the first shaft portion 30 of the movement operating portion 22 has a ball screw 32 and a motor 34 capable of rotating the ball screw 32 normally and reversely. The motor 34 is preferably a servomotor, and which is mounted on a narrow side surface 60 of the main body 25.

As shown in FIG. 12, one end of the ball screw 32 is connected to the output shaft of the motor 34, while the other end of the ball screw 32 is rotatably supported by a bearing 64 fixed on a base plate 62 of the main body 25. The ball screw 32 shown in FIG. 12 can be rotated normally and reversely by the drive of the motor 34 shown in FIG. 11 on the basis of a command from the controller 100.

Moreover, as shown in FIG. 12, the ball screw 32 of the first shaft portion 30 meshes with a nut 36. The nut 36 is called the first shaft ball screw nut, which can be moved in the direction of the arrow X by the normal or reversed rotation of the ball screw 32. The nut 36 is connected or fixed to a first rectangular slide base 70 shown in the two-dot chain line. Accordingly, by the normal or reversed rotation of the ball screw 32, the nut 36 and the first slide base 70 connected or fixed to the nut 36 are can be linearly moved in the direction of the arrow X along two guides 80 and 80 by the effective stroke of the ball screw 32.

On the other hand, the second shaft portion 40 shown in FIG. 12 has a ball screw 42 and a motor 44 capable of rotating the ball screw 42 normally and reversely. The motor 42 is preferably a servo-motor, which is fixed on the above slide base 70.

As shown in FIG. 12, one end of the ball screw 42 of the second shaft portion 40 is connected to the output shaft of the motor 44; while the other end of the ball screw 42 is rotatably supported by a bearing 74. The bearing 74 is fixed on a slider member 90. The slider member 90 can be moved in the direction of the arrow X along the guides 80 and 80 just as the above first slide base 70. Thus, the ball screw 42 shown in FIG. 12 can be normally and reversely rotated by the drive of the motor 44 shown in FIG. 11 on the basis of a command from the controller 100.

Moreover, as shown in FIG. 12, the ball screw 42 of the second shaft portion 40 meshes with a nut 46. The nut 46 is called the second shaft ball screw nut, which can be moved in the direction of the arrow X by the normal and reversed rotation of the ball screw 42. The nut 46 is connected or fixed to a rectangular slide base 85 shown by the two-dot chain line. Accordingly, the nut 46, and the second slide base 85 and the slider member 90 connected or fixed to the nut 46 can be linearly moved along the direction of the arrow X by the effective stroke of the ball screw 42 along the two guides 80 and 80 by the normal and reversed rotation of the ball screw 42.

With this construction, the first slide base 70 can be linearly moved from the original position P0 by the effective stroke of the ball screw 32 of the first shaft portion 30 to the position P1. Moreover, the second slide base 85 can be linearly moved from the original position P0 by the effective stroke of the ball screw 42 of the second shaft portion 40 to the position P2.

Namely, the slide base 85 can be linearly moved from the position P0 to the position P1 shown in FIG. 3 by the effective stroke of the ball screw 32 of the first shaft portion 30 and the effective stroke of the ball screw 42 of the second shaft portion 40.

At this time, since the first shaft portion 30 and the second shaft portion 40 are simultaneously driven by the controller 100 shown in FIG. 11, the second slide base 85 can be linearly moved at the speed of that of the first shaft portion 30 added with that of the second shaft portion 40, that is, the doubling speed. Thus, as compared with the case that only one of the first and second shaft portions 30 and 40 is provided, the second slide base 85 can obtain the doubled moving speed.

Arm Mechanism 24

Next, the arm mechanism 24 will be described with reference to FIG. 11.

In FIG. 11, a base portion 120 of the arm mechanism 24 is connected to the second slide base 85. In FIG. 11, the solid line in the central portion shows the state that the arm mechanism 24 is contracted; and the two-dot chain line in the left shows the state that it is extended.

Moreover, the main body portion 25 includes a member (not shown), which is formed with a cam groove 130 for guiding the movement of the arm mechanism 24. The cam mechanism 130 has a linear portion 132 formed along the direction of the arrow X, and a leading edge portion 134 directed in the direction crossing that of the arrow X by a specified angle. The linear portion 132 and the leading edge portion 134 forms a cam curve.

The cam roller 160 on the side of the arm mechanism 24 is adapted to be guided along the cam groove 130. The arm mechanism 24 has a first arm link 150 and a second arm link 152. One end of the first arm link 150 and one end of the second arm link 152 are rotatably connected to an arm head 154. Moreover, the other end of the first arm link 150 and the other end of the second arm link 152 are rotatably connected to the second slide base 85.

The first arm link 150, second arm link 152, arm head 154 and slide base 85 constitute the so-called parallel link. Moreover, a bracket is fixed on the first arm link 150, and the cam roller 160 is mounted to the above bracket.

In addition, as shown in FIGS. 11 and 13, when the second slide base 85 is located at the position P0, the arm mechanism 24 is perfectly contracted or perfectly escaped, as shown in the central portion of FIG. 11. On the other hand, as the slide base 85 advances from the position P0 to the position P1, the arm mechanism 24 is perfectly extended.

Next, the controller 100 and the position sensor 260 will be described.

The position sensor 260 is, as shown in FIG. 11, mounted on the movable head 12. The position sensor 260 is composed of, for example an encoder, which is adapted to supply an encoder value obtained by the movement of the head 12 to the controller 100 as position information PS.

A drive means 300 of the head 12 can be controlled by the controller 100. Namely, the controller 100 controls the drive means 300 to move the head 12 in the direction of the arrow Z, and to eject the molded product F from the head 12 by the operation of a pin (not shown).

In addition, the motors 34 and 44 are connected to the controller 100. The controller 100 is composed of, for example a standard 4-shaft type controller. The motors 34 and 44 are respectively connected to the first and second shafts of the controller, and the drive means 300 is connected to the third shaft of the controller 300. Moreover, the position sensor 260 is connected to the controller 100 as the encoder of the drive means 300 of the third shaft.

Example for Embodiment 2

A flowchart example for the embodiment 2 is similar to the flowchart example 1 of the embodiment 1 shown in FIG. 7.

There will be described steps in which the molded product F of the molding machine 10 is ejected at a high speed by the robot shown in FIG. 11.

First, in FIG. 11, the arm mechanism 24 of the robot 20 is perfectly contracted, as shown by the solid line.

As the heads 12 and 14 of the molding machine 10 shown in FIG. 10 are closed, the cavity 16 between the heads is filled with resin, to mold the molded product F.

The head 12 starts to open, to open the cavity 16. As the head 12 is started to be opened, the position sensor 260 in FIG. 11 gives position information PS to the controller 100. The controller 100 calculates a target value corresponding to a target position to which the holder 154 of the robot 20 to be moved on the basis of the position information PS as the encoder value.

On the basis of the target value, the controller 100 performs the servo-position control for the motor 34 of the first shaft portion 30 and the motor 44 of the second shaft portion 40 shown in FIG. 11, so that the motor 34 of the first shaft portion 30 and the motor 44 of the second shaft 40 are normally rotated. Thus, the second slide base 85 advances from the position P0 to the position P1 shown in FIG. 11.

Figure 15:
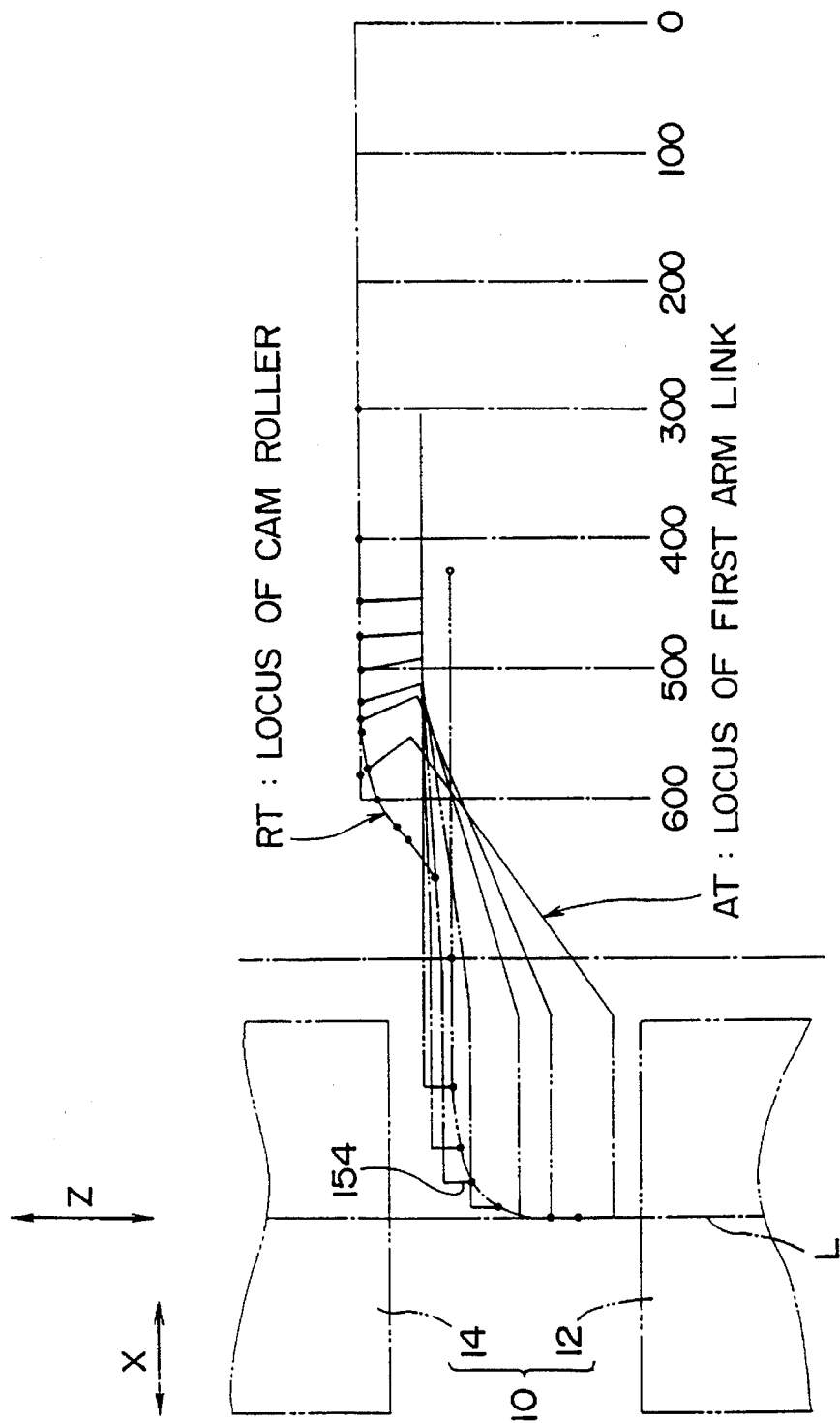
FIG. 15 is a view showing the loci of a first arm ring, cam roller and arm head in an arm mechanism.

Along with the movement of the second slide base 85, the arm mechanism 24 is shifted to the state that it is perfectly contracted and the state that it is perfectly extended. Namely, the first arm link 150 and the second arm link 152 of the arm mechanism 24 are restricted by the configuration of the cam groove 130 through the cam roller 160. As shown in FIG. 15, they are moved in the directions of the arrows X and Z while depicting the locus shown in FIG. 15.

Figure 16:
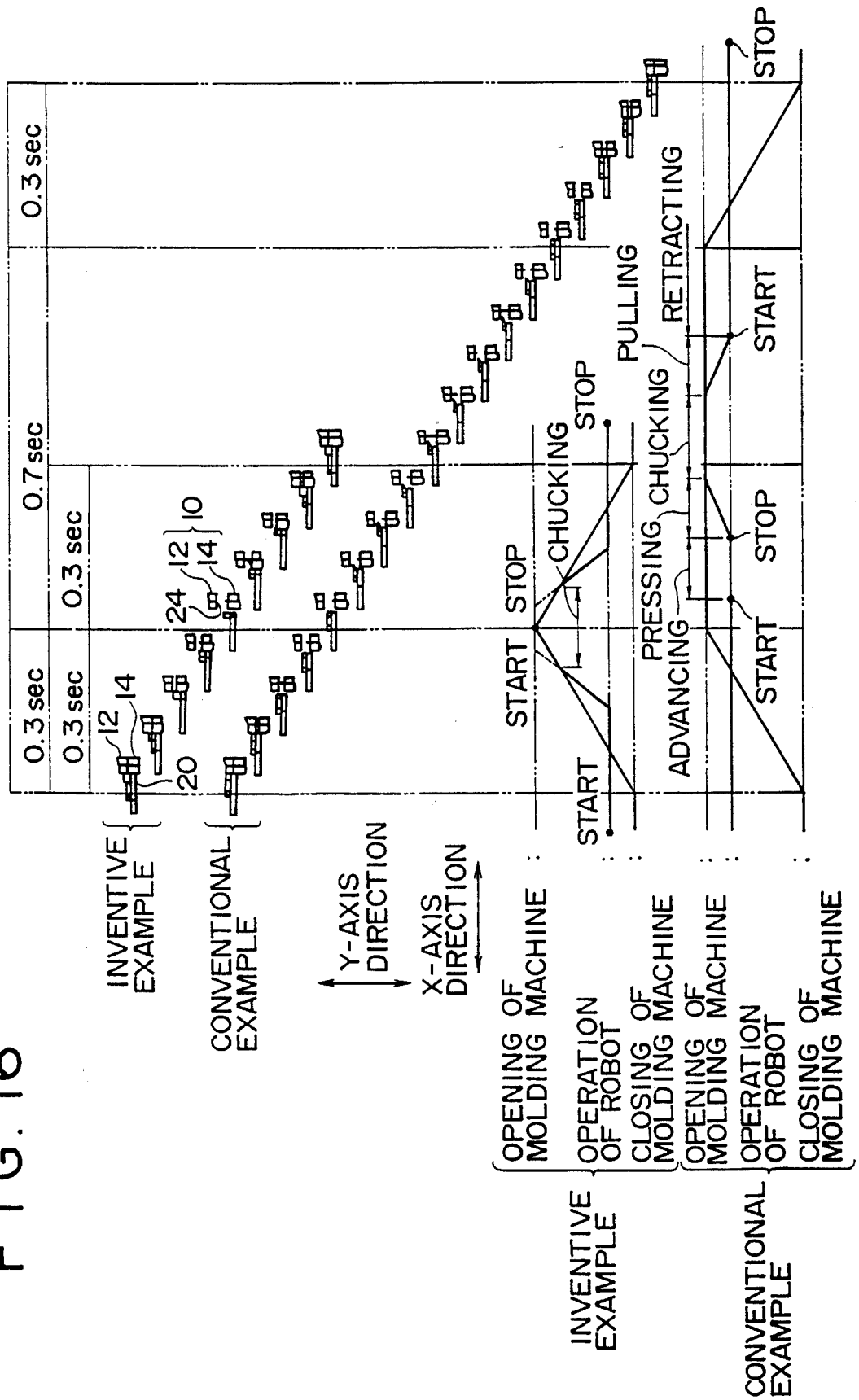
FIG. 16 is a view showing a flowchart example of the embodiment 2 shown in FIGS. 1 and 6 in comparison with the flowchart example of the conventional robot.

Namely, by the operation of the arm mechanism 24 shown in FIG. 11, the arm head (or holder) 154 is moved in the direction of the arrow X shown in FIG. 15 while the cam roller 160 is moved along the linear line portion 132 of the cam groove 130. FIG. 15 shows a locus RT of the cam roller, a locus RT of the first arm link and a locus of the arm head 154. Moreover, the arm head 154 is moved in the synthesizing direction of the arrows X and Z shown in FIG. 15 during the cam roller 160 shown in FIG. 16 is moved along the leading edge portion 134 of the cam groove 130, and is finally directed to the head 12 along a central axis L of the head 12.

Thus, the arm head 154 shown in FIG. 11 advances between the heads 12 and 14, and reaches the molded product F. The molded product F is preferably attracted and chucked by a vacuum attracting means (not shown).

As the head 12 of the molding machine 1 is started to be closed after confirmation of the holding of the molded product F, the controller 100 calculates a target value corresponding to a target position to which the holder 154 is to relocate on the basis of the position information PS of the position of the head 12 from the position sensor 260.

The controller 100 performs the servo-position control for the motors 33 and 44 according to the target value, and reversely to the above-described case, the cam roller 160 is moved along the linear line portion 132 from the leading edge portion 134, so that the arm head 154 is released between the heads 12 and 14 while holding the molded product F, to be thus returned to the perfect contracted state.

After the heads 12 and 14 of the molding machine 10 are closed, the controller 100 gives a signal to eject the molded product F from the holder 154.

In addition, in such an action, when being escaped, the arm head 154 may be released from the position between the heads 12 and 14 at a full speed using the PTP control described in FIG. 8.

The method of operating the movement of the arm mechanism 24 is shown in FIG. 16.

In FIG. 16, the movement of the arm head in the conventional robot is also shown for comparison. As is apparent from FIG. 16, the embodiment of the present invention can eject the molded product from the molding machine for a period of time being approximately half compared with the conventional example. In addition, FIG. 16 shows the action examples for the robot and the molding machine in the embodiment of the present invention, and the conventional example.

According to the embodiment of the present invention, the first and second shaft portions of the movement operating portion 22 are directed in the same direction; accordingly, the arm mechanism 24 can eject the molded product from the molding machine at a doubling speed of the movement operating portion 22 or at the further high speed by the boosting mechanism, thereby enhancing the tact time of the molding machine.

In the case that a doubled speed, twice the conventional speed, is required by the conventional X-Y robot, the construction of the robot including the controller must be largely changed in terms of the power of the motor, danger speed of the ball screw and the life of the guide; accordingly, the size of the X-Y robot is enlarged.

Moreover, according to the embodiment 2 of the present invention, the robot 20 capable of ejecting the molded product at a full speed is combined with the arm head 154 capable of moving in the Z direction, so that it is possible to operate the robot 20 directly after the opening of the cavity of the molding machine. On the contrary, the conventional robot is short in stroke or large in the size of the unit of the drive source, so that the robot cannot be operated unless the cavity is perfectly opened.

Moreover, in the embodiment 2, it is possible to close the cavity of the molding machine directly after the molded product is ejected by the robot. On the contrary, in the conventional robot, the cavity cannot be closed after the molded product is perfectly ejected.

Thus, the embodiment of the present invention makes it possible to minimize the loss time for ejection of the molded product, and to shorten the cycle time.

The present invention is not limited to the above embodiment.

The robot according to the embodiment of the present invention may be applied to the work of mounting or removing parts to or from the molding machine or the other machine, other than the ejection of the molded product of the molding machine. In the above embodiment, the arm mechanism can be moved at the doubled speed by the movement operating portion.

However, in the robot of the embodiment 2, the movement operating portion may be constituted of three motors, three ball screws and three nuts, to be moved at a tripled speed. Furthermore, the arm mechanism may be moved at the tripled speed or more.

Moreover, the X-direction as the first direction is not necessarily crossed at right angles to the Z-direction as the second direction. This may be variously changed according to the apparatus using the robot of the present invention.

Moreover, in the embodiments 1 and 2, in the case that the molded product F is a compact disk molded from the head (die) of the molding machine, the molded product can be attracted and ejected in correspondence with the movement of the head (die). Namely, since the molded product is not ejected using the power for moving the dies as in the conventional robot, the acceleration in moving the holder is not restricted depending on the power for moving the dies.

Additionally, in the embodiments 1 and 2, the molded product is not ejected by the mechanical cam; but is ejected using the software system in which the position information corresponding to the movement of the heads (dies) of the molding machine is transmitted to the controller for controlling the ejection of the molded product on the basis of the position information.

The controller is adapted to control the holder or arm head at the target position determined by the opening degree of the die indicated by the position information transmitted from the position sensor such as the encoder.

The target position can be easily changed by the program of the controller. Accordingly, only by the slight change of the software of the controller, the movement of the movable body such as a die in the user program can be grasped without the change of the mechanical portion. Moreover, inexpensive, simple and standard program and equipment can be used.

Accordingly, the software system can be easily changed in the controller according to the usage. As a result, it is possible to eject the molded product F from the heads in a short amount of time.

For example, in the injection molding for the conventional compact disk, the cycle time takes 5.8 sec and the ejecting time takes 1.6 sec; while in the embodiment 1 of the present invention, the ejecting time is shortened to be 0.8 sec. Since the ejecting time is shortened from the 1.6 sec to 0.8 sec, the whole cycle time can be shortened from 5.8 sec to 5.0 sec, which makes it possible to enhance the productivity by about 16%.

As described above, according to the present invention, an object such as a molded product can be removed from a movable body according to the movement of the movable body such as a die of a molding machine. Accordingly, differently from the conventional system in which the object is moved using the power for the movable body, there is no limitation to the magnitude of the power for moving the movable body, and no limitation to the speed at which the object is moved from the movable body. This makes it possible to move the object from the movable body in a very short time.

Moreover, since the system of the present invention does not use the power for moving the movable body such as a die to the movement of the object through the mechanical cam, the movement of the movable body is freely varied without the change in the mechanical cam.

Embodiment 3

(1) Function

An injection molding machine includes a movable die and a fixed die. A molded product molded between the movable die and the fixed die is ejected from the movable die by an ejector constituted of a robot when the movable die is separated from the fixed die.

Concretely, the ejector of this kind includes a swing type arm for removably holding a molded product. When the movable die is separated from the fixed die to eject the molded product, the swing type arm is swung or rotated and is inserted between the movable die and he fixed die for holding the molded product, after which it is swung in the reversed direction to eject the molded product from the position between the movable die and the fixed die.

The ejectors described above include the following systems, each of which has a disadvantage.

(1) In the system in which the swing type arm is provided on the movable die, since the weight of the swing type arm is added with the weight of the movable die, it is difficult to move the movable die at a high speed when the molded product is ejected. Moreover, because of the large weight, the accuracy in stopping the movable die is poor, which exerts adverse effect on the accuracy in the dimension of the product, and shortens the life of the molding machine.

Figure 17:
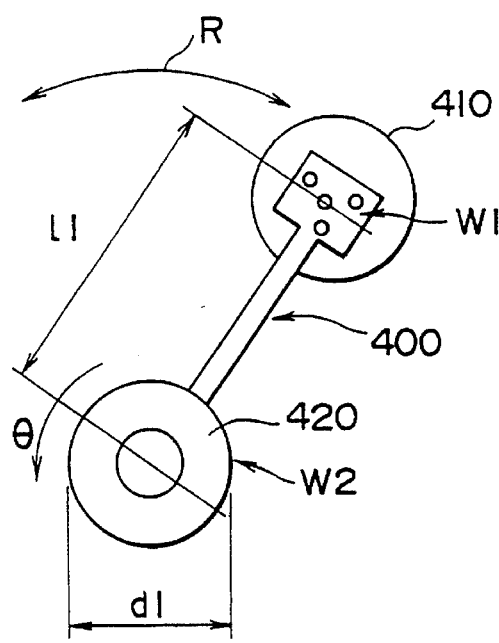
FIG. 17 is a view of the related robot for explaining the improvement made in a preferred embodiment 3 of the present invention.

(2) In the system in which the swing type arm is provided on the movable die (Marchin system), a swing type arm 400 is swung in the direction of the arrow R shown in FIG. 17. The swing is performed by guiding of the cam groove 450 of a cylindrical cam 440 shown in FIG. 18.

In the system in which the swing type arm is fixed in the movable die, the total weight Wt applied to the movable die is expressed by the following equation.

$$Wt = We + W1 + W2 \qquad (1)$$

where We indicates an equivalent weight of the swing type arm 400 shown in FIG. 17 when it is swung; and W1 indicates the weight of a molded product holding portion 410 of the swing type arm 400; and W2 is the weight of a base portion 420 of the swing type arm 400.

The equivalent weight we of the above swing type arm 400 in the Marchin system due to swing is calculated as follows.

First, an inertia moment I is calculated by the following equation.

$$I = \tfrac{1}{2} \cdot W2/g \cdot (dl/2)^2 \cdot (W1/g)l \qquad (2)$$

where l is the length of the arm 400 and the dl is the diameter of the base portion 420.

Next, the kinetic energy T is calculated by the following equation.

$$T = \tfrac{1}{2} \cdot I\theta^2 = 1/2 \cdot I \ (df/dx \cdot x)^2 = 1/2 \cdot I \ (df/dx)^2 \cdot x^2 = 1/2 \cdot Me \cdot x^2 \qquad (3)$$

Figure 18:
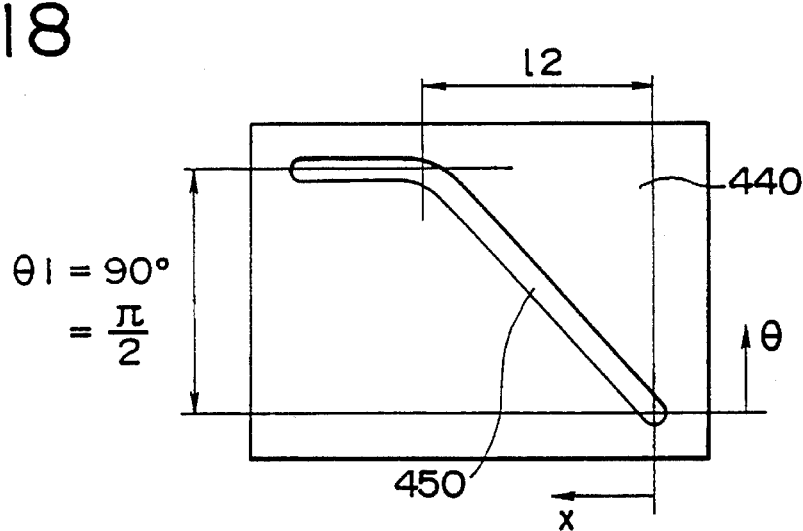
FIG. 18 is a view showing a shape of a cam used for the related robot.

In the equation 3, the cam function of the cylindrical cam 440 is expressed by $\theta = f(x)$, as shown in FIG. 18.

Moreover, Me indicates the weight of the swing type arm 400 converted into the linear motion. The weight Me of the swing type arm 400 converted into the linear motion is expressed by the following equation.

$$Me = I(df/dx)^2 (\text{where, } df/dx = \theta 1/l2) = I \ (\theta 1/l2)^2 \qquad (4)$$

Thus, the equivalent weight We of the arm upon swing action is expressed by the following equation.

$$W_e = M_{eg} = I \, (\theta_1/l_2)^2 \, g \qquad (5)$$

where θ1 indicates the cam guide angle of the cam groove 450 of the cylindrical cam 440. The cam groove guide angle θ1 is 90°.

The total weight Wt applied with the movable die including the equivalent weight We can be obtained by the equation 1.

In the system of (2), there is generated the added weight which is equivalent to that applied to the movable die by the swing action, and has a disadvantage in making if difficult to move the movable die at high speed just as in the system of (1).

(3) In the system shown in the embodiment 1, in FIG. 2, the flange 202 of the swing type arm 201 is rotatably supported by the nut 206 through the bearing 204. Namely, the flange 202 of the swing type arm 201 is indirectly set to the nut 206 through the bearing 204.

The nut 206 meshes with the ball screw 207, and can be moved by the rotation of the ball screw 207 through the drive of the motor 208.

When the nut 206 is moved, the cam follower 210 of the flange 202 is guided along the cam groove 211 of the cylindrical cam 212 as shown in FIG. 3, to swing the swing type arm 201. Moreover, the nut 206 is fixed on the slider 221, which is guided by the slider guide 222. By the effect of the slider 221 and the slider guide 222, the nut 206 can keep the constant angle irrespective of the rotation of the ball screw 07.

Accordingly, the cam follower 210 is guided along the cam groove 211, so that the wing arm 201 is swung as shown in FIG. 2, and the ejecting head 292 of the swing arm 201 ejects the molded product from the movable die 12.

In this system, to shorten the time required for ejection of the molded product, it is desirable to insert the ejecting head 292 between the movable die and the fixed die during the opening of the movable die 12. However, in this system, since the pressure angle from the cylindrical cam 214 to the cam follower 210 is made smaller, the rotational speed of the ejecting head 292 cannot be increased, so that the ejecting head 292 cannot be early inserted between the movable die and the fixed die.

Moreover, this system has the bearing 204 which is large in the size, complex in the structure, and heavy in weight, thereby making it impossible to handle the molded product for a short time.

The embodiment 3 is made for improving the above problems.

(2) Example

Figure 19:
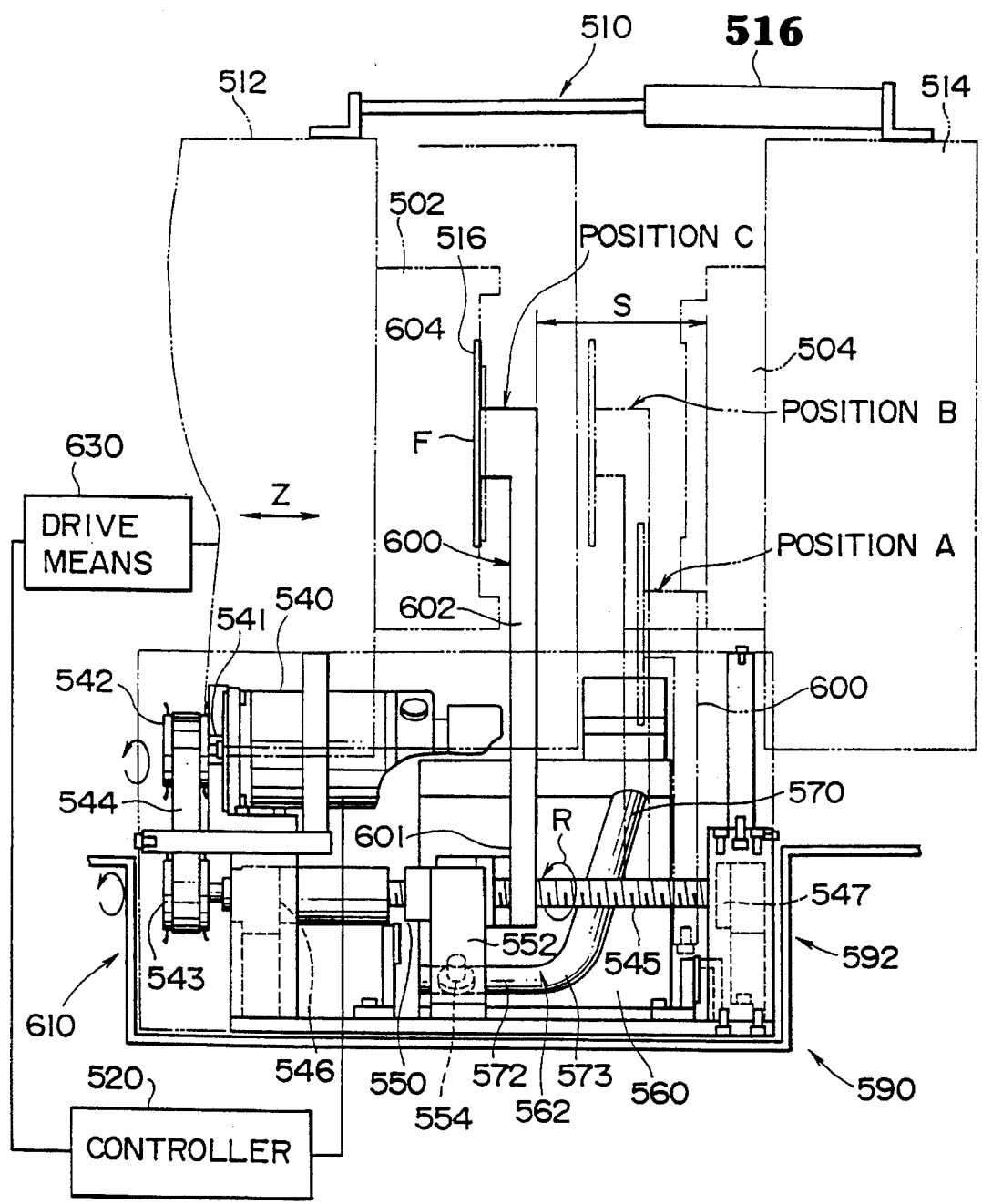
FIG. 19 is a view showing the robot and the molding machine according to the embodiment 3.
Figure 20:
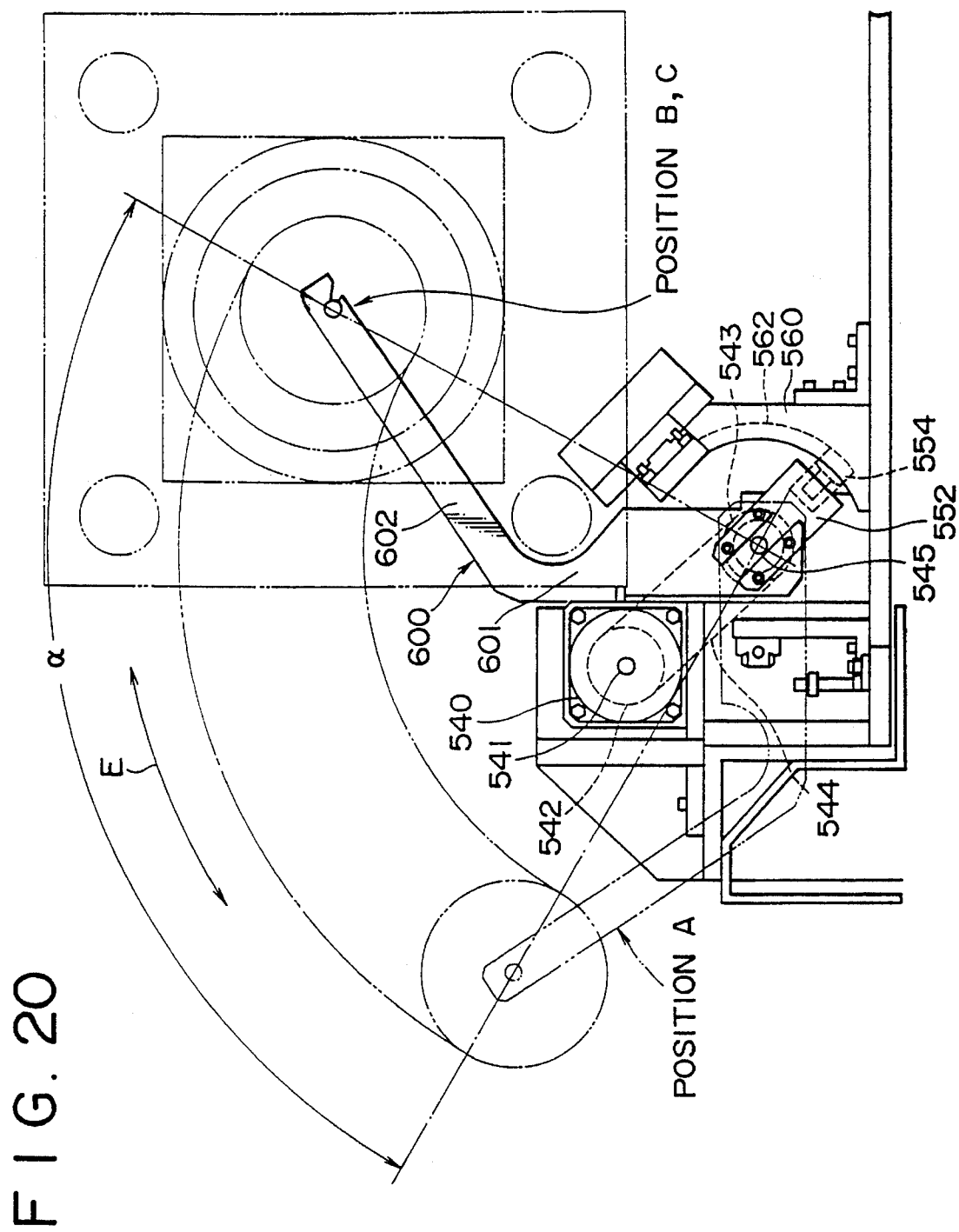
FIG. 20 is a side view of the robot and the molding machine of the embodiment 3.

An ejecting robot 590 shown in FIGS. 19 and 20 is used for ejecting a molded product F molded in an injection molding machine 510 in this example.

First, the injection molding machine 510 will be described.

The injection molding machine 510 has a movable disk 512 and a fixed disk 514. The movable disk 512 includes a movable die 502, and the fixed disk 514 includes a fixed die 504. The movable disk 512 is movable in the first direction of the arrow Z by a drive means 630.

On the other hand, the fixed die 504 is formed with a passage (not shown), through which the material to be molded is poured in a cavity 516 between the movable die 502 and the fixed die 504.

The molded product F includes a disk-like molded product, for example a rotational type information recording medium such as an optical disk and optical-magnetic disk.

Next, the ejecting robot 590 will be described.

As shown in FIGS. 19 and 20, the ejecting robot 590 includes an ejecting arm 600 as a holding means for removably holding the molded product F, a moving means 592 for ejecting the molded product F from the movable die 502 of the molding machine 510 by movement of the ejecting arm 600, a position sensor 516 for detecting the position of the movable disk 512, and a controller 520.

First, the ejecting arm 600 will be described.

As shown in FIGS. 19 and 20, the ejecting arm 600 includes a nut 550, a base portion 601, an extension portion 602, and an ejecting head 604.

As shown in FIG. 20, the extension portion 602 is formed on the base portion to be tilted at specified angles.

The leading edge portion of the extension portion 602 includes an ejecting head 604 removably holding the molded product F. The ejecting head 604 is adapted to removably hold the molded product F by vacuum attraction.

Moreover, the base portion 601 is directly fixed on the nut 550. The nut 550 meshes with a ball screw 545 as described later.

Next, the moving means 592 will be described.

As shown in FIGS. 19 and 20, the moving means 592 is adapted to move the molded product F from the movable die 502 or to remove the molded product F and transfer it to the different location.

The moving means 592 includes a drive portion 610. The drive portion 610 is driven to linearly move the ejecting arm 600 along the first direction of the arrow Z and move it while swinging or rotating in the second direction of the arrow E.

As shown in FIG. 19, the moving means 592 moves the ejecting arm 600 in the Z direction (first direction) by a specified stroke S; while as shown in FIG. 20, the moving means 92 swings or rotates the ejecting arm 600 in the rotational direction (second direction) by a specified swing angle α.

Thus, the moving means 592 linearly moves the ejecting arm 600 in the first direction of the arrow Z, and rotates it in the second direction of the arrow E, to eject the molded product F from the movable die 2.

The drive portion 610 of the moving means 592 has the following construction.

A pulley 542 is fixed around an output shaft 541 of a motor 540, and a belt 544 is set between the pulley and another pulley 543.

The pulley 543 is connected to the ball screw 545, which can be rotated in the direction of the arrow R by the drive of the motor 540.

The ball screw 545 is rotated counterclockwise from the left end of the ball screw 545.

The one end and the other end of the ball screw 545 are respectively supported by supporting members 546, and 547.

As shown in FIG. 19, the nut 550 of the ejecting arm 600 holding means directly meshes with the ball screw 545. The ball screw 545 functions as a first guide means for directly moving the ejecting arm 600 and the nut 550 along the first direction of the arrow Z.

The base portion 601 of the above ejecting arm 600 is fixed on the nut 550. Moreover, a supporting member 552 is fixed on the nut 550, and a cam follower 554 is set on the supporting member 552.

A cylindrical cam 560 is disposed to be in parallel to the ball screw 545. A cam groove 562 is formed on the cylindrical cam 560.

The cam follower 554 is guided in the cam groove 562. The cam groove 562 has a first cam groove guide portion 570 and a second cam groove guide portion 572, as shown in FIG. 19.

As shown in FIG. 19, the first cam groove guide portion 570 is formed to be directed leftward, tiltingly and downwardly. Moreover, the second cam groove guide portion 572 is, as shown in FIG. 19, is formed to be in the horizontal direction or the direction parallel to the ball screw 545.

The first cam groove guide portion 570 is smoothly connected to the second cam groove guide portion 572. The cylindrical cam 560 and the cam follower 554 constitute a second guide means for guiding the ejecting arm 600 and the nut 550 by moving them along the second direction of the arrow E.

The above position sensor 516 is adapted to detect the linear position such as a linear encoder. Namely, the position sensor 516 can detect the position of the movable die 502 relative to the fixed die 504.

The controller 520 is connected to the drive means 630 of the movable disk 512 and the motor 540, to control the drive means 630 and the motor 540. Moreover, the position sensor 516 is connected to the controller 520, to give the position information of the movable die 502 obtained by the position sensor 516 to the controller 520.

Example of Embodiment 3

Figure 21:
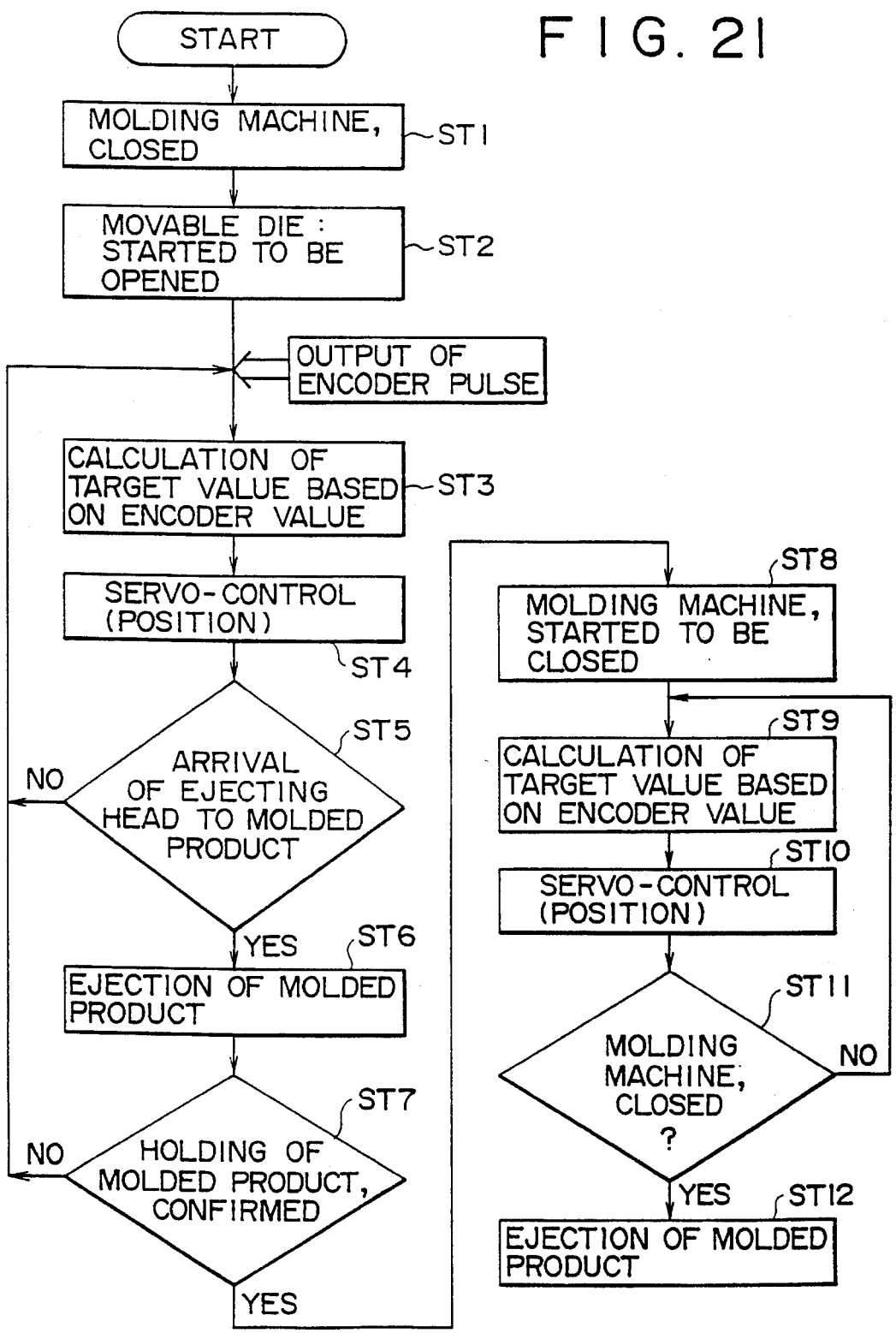
FIG. 21 is a flow chart showing the method of the embodiment 3 shown in FIGS. 19 and 20.

Next, the flowchart example of the third embodiment will be described by way of the steps ST1 to ST12 of the flowchart shown in FIG. 21.

First, in the step ST1, the movable disk 512 and the fixed disk 514 shown in FIG. 19 are closed. At this time, the cavity is filled with resin, to mold the molded product F.

When the movable disk 512 and the fixed disk 514 are closed, the ejecting arm 600 is located at a position A as an initial position shown in the two-dot chain line, as shown in FIGS. 19 and 20. In this initial state, the cam follower 554 shown in FIG. 19 is located at the first cam groove guide portion 570 of the cam groove 562.

As the drive means 630 is driven on the basis of the command of the controller 520, the movable disk 512 is started to be separated from the fixed disk 514 (step ST2). When the movable disk 512 is separated from the fixed disk 514, the position sensor 516 transmits the pulse of the encoder value. Accordingly, the controller 520 receives the encoder value as the position information of the movable disk 512 from the position sensor 516.

Meanwhile, on the basis of the command of the controller 520, the motor 540 is driven simultaneously or differently from the drive of the drive means 630, and the rotational force of the motor 540 is transmitted to the ball screw 545 through the two pulleys 542 and 543 and the belt 544, so that the ball screw 545 is rotated in the direction of the arrow R shown in FIG. 19.

The controller 520 calculates a target value as a target position to which the ejecting arm 600 is to be moved, on the basis of the position information of the movable die 502 detected by the position sensor 516.

On the basis of the target value, the controller 520 gives the servo-control signal to the motor 540, to perform the servo-control drive for the motor 540 by the rotational angle corresponding to the target value (step ST4).

By the servo-control drive of the motor 540, the ball screw 545 is rotated in the direction of the arrow R shown in FIG. 19. Accordingly, the ejecting arm 600 and the nut 552 are moved along the left direction as the first direction of the arrow Z and advance from the position A to the position B. At the same time the ejecting arm 600 and the nut 522 are rotated in the position B from the state of the position A along the clockwise direction as the second direction of the arrow E shown in FIG. 20.

At this time, the cam follower 554 is moved from the first cam groove guide portion 570 shown in FIG. 19 to the second groove guide portion 572 through the connection portion 573. Namely, in FIG. 19, the cam follower 554 is moved from the right and upper portion to the left and down portion.

The cam follower 554 is inserted in the second cam groove guide portion 572 through the connection portion 573, and then the ejecting arm 600 and the nut 550 are only moved in the left direction as the first direction shown in FIG. 19 while not being swung or rotated; and the ejecting arm 600 and the nut 550 are moved to the position C shown in FIG. 19.

After that, when the ejecting head 604 approaches the movable die 502 as shown in FIG. 19 and is brought in contact with the molded product F (step ST5), an ejection pin (not shown) is acted to eject the molded product F from the movable die 502 (step ST6).

When the ejecting head 604 does not approach the molded product F, the process is returned to the step ST3.

The ejected molded product F is attracted and held on the side of the ejecting head 504 (step ST7).

When it is confirmed that the molded product F is attracted and held on the side of the ejecting head 604, the controller 520 gives a signal to the drive means 630, and the movable disk 512 is moved to the side of the fixed disk 514, to close the molding machine 510 (step STS).

As the movable disk 512 is moved on the side of the fixed disk 514 to close the molding machine 510, the position information of the movable disk 512 as the encoder value is given to the controller 520 from the position sensor 516.

The controller 520 calculates a target value corresponding to a target position to which the mounting arm 604 and the nut 55 are to be moved on the basis of the position information (step ST9). The controller 520 gives the servo-position control signal to the drive means 630, and performs the servo-position control for the motor 540 (step ST10).

As the motor 540 is reversely rotated on the basis of the servo-position control signal, the mounting arm 600 and the nut 550 act in the manner reversed to the above process. Namely, the cam follower 554 shown in FIG. 19 is moved in the first cam groove guide portion 570 from the second cam groove guide portion 572 through the connection portion 573. Namely, in FIG. 19, the cam follower 554 is moved from the left and down portion to the right and upper portion.

While the cam follower 554 is guided by the second cam groove guide portion 572, the mounting arm 600 is moved only in the right direction shown in FIG. 19 while not being swung or rotated.

As the cam follower 554 is guided by the second cam groove guide portion 572, the ejecting arm 600 is further moved in the right direction shown in FIG. 19, and is simultaneously rotated from the position B to the position A shown in FIGS. 19 and 20.

Thus, the ejecting head 604 of the ejecting arm 600 is moved from the position between the movable die 502 and the fixed die 504 while holding the molded product F, and the ejecting arm 600 reaches the position A.

As the movable disk 512 of the molding machine 510 is closed (step ST11), the molded product F is ejected and discharged from the arm 600 (step ST12), thus completing the continuous ejecting actions.

According to the embodiment of the present invention, the so-called ejecting arm 600 is fixed directly on the ball screw 545 or the nut 550 screwed to the ball screw 545. Accordingly, the direction of the force applied to the cam groove guide portion 570 by the cam follower 554 (hereinafter, referred to as pressure angle) is not only the first direction of the arrow Z as conventional, but also the rotational direction R of a force of the ball screw 550, so that the ejecting arm 600 can be largely swung even when the movement in the first direction of the arrow Z is small so long as the component of the force in the rotational direction R corresponds to the advance direction of the cam follower 554.

Accordingly, to correspond the component of the force in the rotational direction R to the advance direction of the cam follower 554, the rotational direction R of the ejecting arm 600 is adjusted in the direction of the screwing rotational advance of the screw groove of the ball screw 50 (hereinafter, referred to as turning), in viewpoint of the overlapping portion of the rotational action and the linear action in the direction of the arrow Z of the ejecting arm 600.

Concretely, in the case that the arm 600 is turned rightwardly from the linear advance direction Z, the screw groove of the ball screw 545 is formed in the right ward turning direction; while in the case that the arm 600 is leftwardly turned from the linear advance direction Z, the screw groove of the ball screw 545 is formed in the leftward turning direction.

After the molding machine has just started to be opened, the ejecting head can be inserted between the movable die and the fixed die, and follow the linear action of the movable die.

Even during the opening of the dies, the ejecting motion for the molded product is possible, and the time required for ejection in the cycle of the injection molding can be shortened, resulting in the increased productivity.

Since the power of the rotational motion and the linear motion can be obtained using one ball screw, the structure can be simplified with high reliability.

In the system shown in the description of the function of this embodiment, since a problem is present in the pressure angle between the cylindrical cam and the cam follower, it is difficult to cause the ejecting head to be inserted in the dies in the early stage of the opening of the dies.

On the contrary, the third embodiment of the present invention, it is possible to insert the ejecting head in the very early stage.

The reason for this is that, as described above, the pressure angle between the cylindrical cam and the cam follower is small and is not restricted, and further the ejecting arm can be largely swung even when the movement in the first direction is small, so that it is possible to shorten the interval of the linear motion when the ejecting arm is swung.

Moreover, as shown in the first embodiment, the robot does not require the bearing, and further does not require the slider and the slider guide for holding the nut at the constant angle irrespective of the rotation of the ball screw. Accordingly, it is possible to simplify the structure of the robot, to reduce the weight, and to make small the size.

The present invention is not limited to the above embodiments.

For example, the present invention may be applied to the ejection of another object different from the molded product.

The first guide means is not limited to the ball screw, and the shape of the cam groove of the cylindrical cam constituting the second guide means can be freely selected.

As described above, according to the embodiments of the present invention, it is possible to eliminate the necessity of using the bearing, to simplify the structure and reduce the weight, and to handle the object such as the molded product for a short period of time.

What is claimed is:

1. An industrial robot comprising:

opened/closed bodies composed of two members, which are capable of being opened/closed and which contain an object therebetween;

a holding means located proximate to said two members for holding said object when said two bodies are opened;

a driving means for linearly moving said holding means in an opening/closing direction of said opened/closed bodies;

an advancing/retracting means which advances/retracts in a release direction with respect to said opened/closed bodies by turning of said holding means when said holding means is moved in the opening/closing direction of said opened/closed bodies;

a position sensor, mounted proximate to at least one of said two members, for detecting the positions of said opened/closed bodies; and a control means for receiving position information of said opened/closed bodies from said position sensor, and controlling said driving means for ejecting said object from said opened/closed bodies on the basis of the position information of said opened/closed bodies.

2. An industrial robot according to claim 1, wherein said control means controls said advancing/retracting means to be moved in the release direction at an approximately maximum speed of said advancing/retracting means when said opened/closed bodies are closed.

3. An industrial robot according to claim 2, wherein said control means controls said holding means to be moved in the opening/closing direction of said opened/closed bodies by rotation of a feed screw, and said advancing/retracting means includes a guide means for advancing/retracting with respect to said opened/closed bodies by turning of said holding means when said feed screw is rotated.

4. An industrial robot according to claim 1, wherein said control means controls said holding means to be moved in the opening/closing direction of said opened/closed bodies by rotation of a feed screw, and said advancing/retracting means includes a guide means for advancing/retracting with respect to said opened/closed bodies by turning of said holding means when said feed screw is rotated.

5. An industrial robot according to claim 1, wherein said opened/closed bodies are composed of dies of a molding machine.

6. A robot for ejecting an object mounted on a movable body from said movable body, comprising:

opened/closed bodies composed of said movable body and a non-movable body;

a holding means located proximate to said opened/closed bodies for holding said object mounted on said movable body when said two bodies are opened; and a moving means for ejecting said object from said movable body by movement of said holding means;

wherein said moving means includes a first guide means meshing with said holding means for linearly moving said holding means in a first direction by rotation with respect to a position of said movable body; and a second guide means for rotating said holding means in a second direction while said first guide means is rotated directed in said first direction.

7. A robot according to claim 6, wherein said first guide means is composed of a ball screw, said holding means has a nut, and said ball screw meshes with said nut.

8. A robot according to claim 6, wherein said second guide means is composed of a cam and a cam follower meshing with said cam.

9. A robot according to claim 6, wherein said movable body is composed of a movable die of a molding machine.

10. An industrial robot comprising:

opened/closed dies of a molding machining composed of two dies, which are capable of being opened/closed and which contain an object therebetween;

a holding means located proximate to said two dies for holding said object when said two dies are opened;

a driving means for linearly moving said holding means in an opening/closing direction of said opened/closed dies;

an advancing/retracting means which advances/retracts in a release direction with respect to said opened/closed dies by turning of said holding means when said holding means is moved in the opening/closing direction of said opened/closed dies;

a position sensor, mounted relative to at least one of said two dies, for detecting the positions of said opened/closed dies; and a control means for receiving position information related to said opened/closed dies from said position sensor, and controlling said driving means for ejecting said object from said opened/closed dies on the basis of the position information of said opened/closed dies.

11. An industrial robot according to claim 10, wherein said control means controls said advancing/retracting means to be moved in the release direction at an approximately maximum speed of said advancing/retracting means when said opened/closed dies are closed.

12. An industrial robot according to claim 11, wherein said control means controls said holding means to be moved in the opening/closing direction of said opened/closed dies by rotation of a feed screw, and said advancing/retracting means includes a guide means for advancing/retracting with respect to said opened/closed dies by turning of said holding means when said feed screw is rotated.

13. An industrial robot according to claim 10, wherein said control means controls said holding means to be moved in the opening/closing direction of said opened/closed dies by rotation of a feed screw, and said advancing/retracting means includes a guide means for advancing/retracting with respect to said opened/closed dies by turning of said holding means when said feed screw is rotated.

14. A robot for ejecting an object mounted on a movable die of a molding machine from said movable die, comprising:

opened/closed dies of a molding machine composed of said movable die and a non-movable die;

a holding means located relative to said opened/closed dies for holding said object mounted on said movable die when said two dies are opened; and a moving means for ejecting said object from said movable die by movement of said holding means;

wherein said moving means includes a first guide means meshing with said holding means for linearly moving said holding means in a first direction by rotation with respect to a position of said movable die; and a second guide means for rotating said holding means in a second direction while said first guide means is rotated directed in said first direction.

15. A robot according to claim 14, wherein said first guide means is composed of a ball screw, said holding means has a nut, and said ball screw meshes with said nut.

16. A robot according to claim 14, wherein said second guide means is composed of a cam and a cam follower meshing with said cam.

* * * * *